United States Patent
Schoenberger et al.

(10) Patent No.: US 8,983,281 B2
(45) Date of Patent: Mar. 17, 2015

(54) METHOD AND DEVICE FOR COOLING OF IR EMITTERS FOR PREFORMS

(75) Inventors: Wolfgang Schoenberger, Brennberg (DE); Christian Holzer, Schierling (DE); Simon Fischer, Regensburg (DE)

(73) Assignee: Krones AG, Neutraubling (DE)

( * ) Notice: Subject to any disclaimer, the term of this patent is extended or adjusted under 35 U.S.C. 154(b) by 1013 days.

(21) Appl. No.: 13/066,179

(22) Filed: Apr. 8, 2011

(65) Prior Publication Data

US 2011/0256493 A1 Oct. 20, 2011

(30) Foreign Application Priority Data

Apr. 14, 2010 (DE) .................. 10 2010 015 018

(51) Int. Cl.
| | |
|---|---|
| *D02J 13/00* | (2006.01) |
| *B29C 49/64* | (2006.01) |
| *B29B 13/02* | (2006.01) |
| *B29B 13/04* | (2006.01) |
| *B29C 35/08* | (2006.01) |
| *B29C 49/06* | (2006.01) |

(52) U.S. Cl.
CPC ............. *B29C 49/64* (2013.01); *B29B 13/024* (2013.01); *B29B 13/04* (2013.01); *B29C 2035/0822* (2013.01); *B29C 49/06* (2013.01)
USPC ........... 392/417; 392/407; 392/411; 392/418; 425/526

(58) Field of Classification Search
None
See application file for complete search history.

(56) References Cited

U.S. PATENT DOCUMENTS

| | | | | |
|---|---|---|---|---|
| 4,076,071 | A | * | 2/1978 | Rosenkranz et al. ......... 165/263 |
| 4,606,723 | A | | 8/1986 | Pasternicki ................... 432/124 |
| 5,322,651 | A | | 6/1994 | Emmer ........................... 264/25 |
| 5,714,109 | A | | 2/1998 | Diller ............................ 264/454 |
| 6,361,301 | B1 | * | 3/2002 | Scaglotti et al. ........... 425/174.4 |
| 6,632,087 | B1 | * | 10/2003 | Armellin et al. .............. 432/202 |
| 7,121,821 | B2 | | 10/2006 | Pickel ......................... 425/174.4 |
| 7,448,866 | B2 | | 11/2008 | Doudement .................. 432/202 |
| 7,553,156 | B2 | | 6/2009 | Doudement .................. 432/121 |
| 7,649,158 | B2 | | 1/2010 | Doudement .................. 219/404 |
| 8,303,290 | B2 | * | 11/2012 | Feuilloley et al. ......... 425/174.4 |
| 2008/0099961 | A1 | | 5/2008 | Feuilloley et al. ............ 264/405 |
| 2010/0096782 | A1 | | 4/2010 | Stoiber et al. ................. 264/492 |

FOREIGN PATENT DOCUMENTS

| | | |
|---|---|---|
| CN | 1284160 | 2/2001 |
| CN | 101 690 382 | 3/2010 |
| DE | 35 10 241 A1 | 10/1985 |
| DE | 20 020 150 U1 | 3/2001 |

(Continued)

*Primary Examiner* — Thor Campbell

(74) *Attorney, Agent, or Firm* — Davidson, Davidson & Kappel, LLC

(57) ABSTRACT

A method for cooling IR emitters in a heating device for warming preforms before processing them in a stretch blow or blow molding device. IR emitters are arranged on at least one sidewall of the heating device parallel to the transport direction of the preforms, with at least one back reflector arranged on the side of the IR emitters facing away from the performs. The preforms to be warmed include a mouth region and a longitudinal axis and the mouth region is cooled with a first coolant flow. An almost vertical second coolant flow passes between the IR emitters and the at least one back reflector, this second coolant flow being at least partially fed by the almost horizontal first coolant flow and/or is united with the almost horizontal first coolant flow. A heating device and cooling device are also provided.

13 Claims, 7 Drawing Sheets

(56) References Cited

FOREIGN PATENT DOCUMENTS

| DE | 101 45 456 A1 | 5/2003 |
| DE | 600 30 327 T2 | 10/2007 |
| DE | 10 2007 031 210 A1 | 1/2009 |
| DE | 10 2007 031 771 A1 | 1/2009 |
| EP | 1 763 428 B1 | 3/2007 |
| FR | 26 89 442 A1 | 10/1993 |
| FR | 28 63 931 A1 | 6/2005 |
| FR | 28 63 932 A1 | 6/2005 |
| WO | WO 01/62463 | 8/2001 |

* cited by examiner

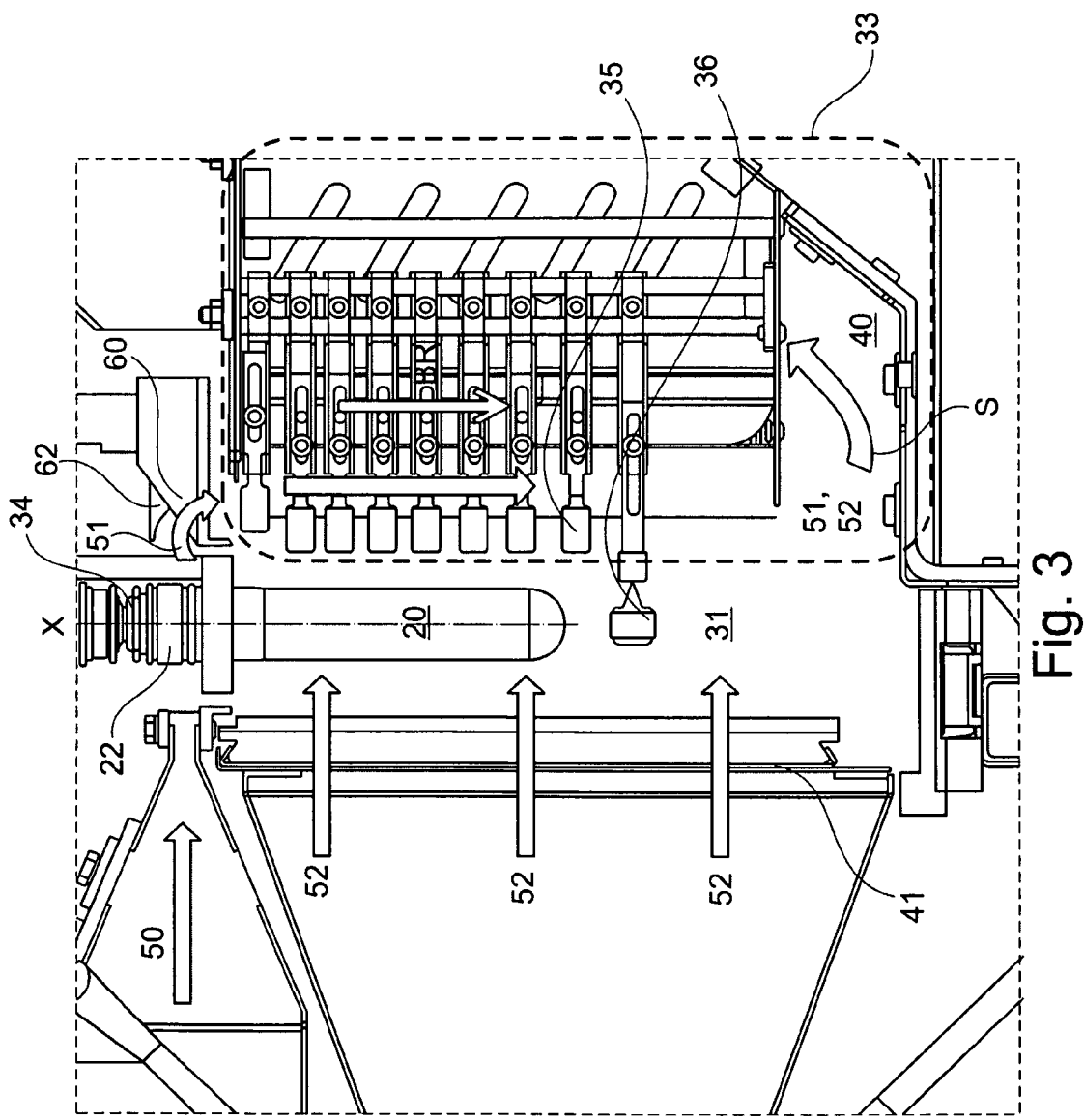

METHOD AND DEVICE FOR COOLING OF IR EMITTERS FOR PREFORMS

This claims the benefit of German Patent Application DE 10 2010 015 018.5, filed Apr. 14, 2010 and hereby incorporated by reference herein.

The present invention regards a method for cooling IR emitters, a heating device for preforms and means for cooling of emitters.

BACKGROUND

Preforms made out of a thermoelastic material, for instance PET, are used for the production of plastic bottles. The preforms are first warmed or heated and than blow moulded into the desired form in a stretch blow or blow moulding device. The preforms are especially transported on conveying means through a heating device before being processed in the blowing station.

During the currently used process the preforms are held in the heating device by a shaft that is located on a rotary bearing on a link of a transport chain. In a heating device a plurality of chain links with pivoted shafts are connected to form an endless circumferential transport chain. On the outer side of the straight side walls of the oven heating means are arranged, especially IR emitters, that apply the required heat onto the preforms. On the inner side and at the bottom reflectors are arranged to make the best use of the IR radiation. Air is blown into the oven through slots in the reflectors arranged opposite the heating means to cool the surface of the preforms preventing burns on the preform surface mantle area.

Because of continually rising energy prices a high efficiency of the machinery and the facilities achieves more and more importance. It is known that a constriction of the heating tunnel improves the efficiency of the energy use during the heating process.

A major disadvantage when narrowing the heating tunnel is that the IR emitters are closer to each other which leads to a dramatic increase in the temperature of the emitter bulbs. The temperatures can rise as high as 900° C. and/or even higher. This leads to premature failure of the bulbs and to reduced lifetimes. Therefore the emitters need to be cooled.

DE 20 020 150 U1 describes a heating path for stretch blow moulding of preforms with IR emitters, whereby the reflector arranged opposite the emitters has cooling surfaces and/or is actively cooled.

DE 35 10 241 A1 shows a heating device whereby a fan is blowing cool air to the connections and back sides if the IR emitters to cool them down thereby elongating their lifetime.

DE 600 30 327 T2 shows IR emitters that are cooled by an air flow. The air flow first meets the surface of the preforms. After that the air flow is directed to the emitters and their sockets through suitable openings.

SUMMARY OF THE INVENTION

An object of the present invention is to realize an improved means for cooling of emitters to optimize the amount of required heating energy on the long term. It is an alternate or additional object of the present invention to provide a method for cooling IR emitters in a heating device for warming preforms. A corresponding heating device may be used in connection with a stretch blow or blow molding device.

The present invention provides IR emitters that are arranged on at least one sidewall of the heating device parallel to the transport direction of the preforms. At least one back reflector is located behind the IR emitters, on the side of the IR emitters facing away from the preforms.

The energy efficiency can be increased by using the IR lamps under very high temperatures and/or by reducing the distance between the IR emitters and the back reflector. But these measurements lead to a faster damage and a higher wear out of the emitters.

To solve the problem a cooling of the lamps or emitters was developed according to the present invention. Hereby a coolant air flow passes behind and/or around the bulbs and sockets of the lamps or emitters. By this the temperature of the emitters can be reduced to an acceptable level thereby ensuring a higher durability.

The preforms to be warmed comprise a mouth region with a thread and a longitudinal axis. To ensure that the mouth region and especially the thread is not deformed and thereby made unusable during the following stretch moulding process, the mouth region has to be protected during the heating process. This is preferentially done by cooling the mouth or thread region with a first coolant flow that is also called thread coolant flow.

According to the present invention an almost vertical second coolant flow may pass between the IR emitters and the at least one back reflector. This second coolant flow is also called emitter coolant flow. The second coolant flow is almost vertically arranged meanwhile the first coolant flow is almost horizontally arranged. The second coolant flow is at least partially fed by the almost horizontal first coolant flow and/or the second coolant flow is united with the almost horizontal first coolant flow. The second coolant flow passes behind the IR emitters, especially around their bulbs and sockets, thereby cooling them.

Preferably the second coolant flow passes almost parallel to the longitudinal axis of the preforms.

According to a preferred embodiment of the invention the second coolant flow is generated by a coolant producing device. The coolant producing device is arranged in a way that the direction of the movement of the generated second coolant flow passes mostly parallel to the longitudinal axis towards the mouth region of the preform. The coolant producing device is preferably arranged below the IR emitters and blows the coolant flow upwards between the IR emitters and the back reflector.

The first and the second coolant flow unite above the arrangement of the IR emitters. According to one preferred embodiment of the invention the first coolant flow has a higher velocity than the second coolant flow. This leads to a suction effect that further supports and encourages the upwardly directed drainage of the second coolant flow. Thereby the temperature of the emitter can be dramatically reduced. It could be shown that by these measures the temperature of the emitters can be reduced by about 200° C.

According to another preferred embodiment of the invention the second coolant flow is generated by branching off and diverting at least part of the first coolant flow that it used to cool the mouth or thread region of the preforms. The branched off and diverted coolant flow is directed to pass between the IR emitter and the back reflector. Especially it is directed in such a way that it passes mostly antiparallel (i.e., parallel but in the opposite direction) to the longitudinal axis of the preform towards its mouth region. This branched off and diverted coolant flow therefore also passes behind the IR emitters thereby cooling them.

With the method according to the invention the bulbs and/or the sockets of the emitters can be cooled. According to another embodiment of the invention emitters with double glazed bulb are used and the coolant flow is directed to pass between the two glass surfaces.

The described means for cooling of emitters improve the energy efficiency. This can also be derived from the Stefan Boltzman law. Generally speaking, the hotter the coil, the better the emitter. When the temperature of the emitter bulb is actively cooled, a hotter coil can be used. According to the Stefan Boltzman law $P=\sigma \cdot A \cdot T^4$ (whereby P=radiant power; σ=Boltzmann constant; A=area of the body and T=absolute temperature)

the radiant power of a body changes in proportion to the fourth potency of its absolute temperature, therefore a massive increase in radiant power can be achieved by increasing the temperature of the coil.

The invention furthermore relates to a heating device that comprises suitable means to apply the described method. The heating device especially comprises means for the production of an almost vertical second coolant flow that passes almost vertically between the IR emitters and the at least one back reflector. This second coolant flow is preferably parallel or antiparallel to the longitudinal axis of the preforms.

According to the invention this second coolant flow is at least partially feedable by the almost horizontal first coolant flow and/or is unitable with the almost horizontal first coolant flow.

According to a preferred embodiment of the invention the heating devices features a coolant plate with at least one special air or coolant conductor and at least one opening slot. The air or coolant conductors divert at least part of the coolant flow cooling the mouth or thread of the preforms downwards. This downward directed coolant flow is led through the opening slot to the IR emitters; especially it is directed to pass between the IR emitters and the back reflector.

According to another preferred embodiment of the invention the heating devices comprises a coolant producing device that has already been described above. The coolant producing device can be a fan, a blower, an air compressor or another suitable device.

The invention furthermore relates to means for cooling of emitters for the use in a heating device described above, whereby the means for cooling of emitters is a second coolant flow arranged between the IR emitters and the back reflector, whereby this second coolant flow is at least partially feedable by and/or unitable with the first coolant flow.

The invention can be used in microwave ovens, circular ovens, linear ovens, stationary ovens etc. Furthermore the use of individual heating pockets is possible, whereby each preform is selectively tempered in a separate heating pocket.

BRIEF DESCRIPTION OF THE DRAWINGS

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged to facilitate an understanding of the invention.

FIG. 3 shows a first embodiment of means for the cooling of emitters.

Figure 1:
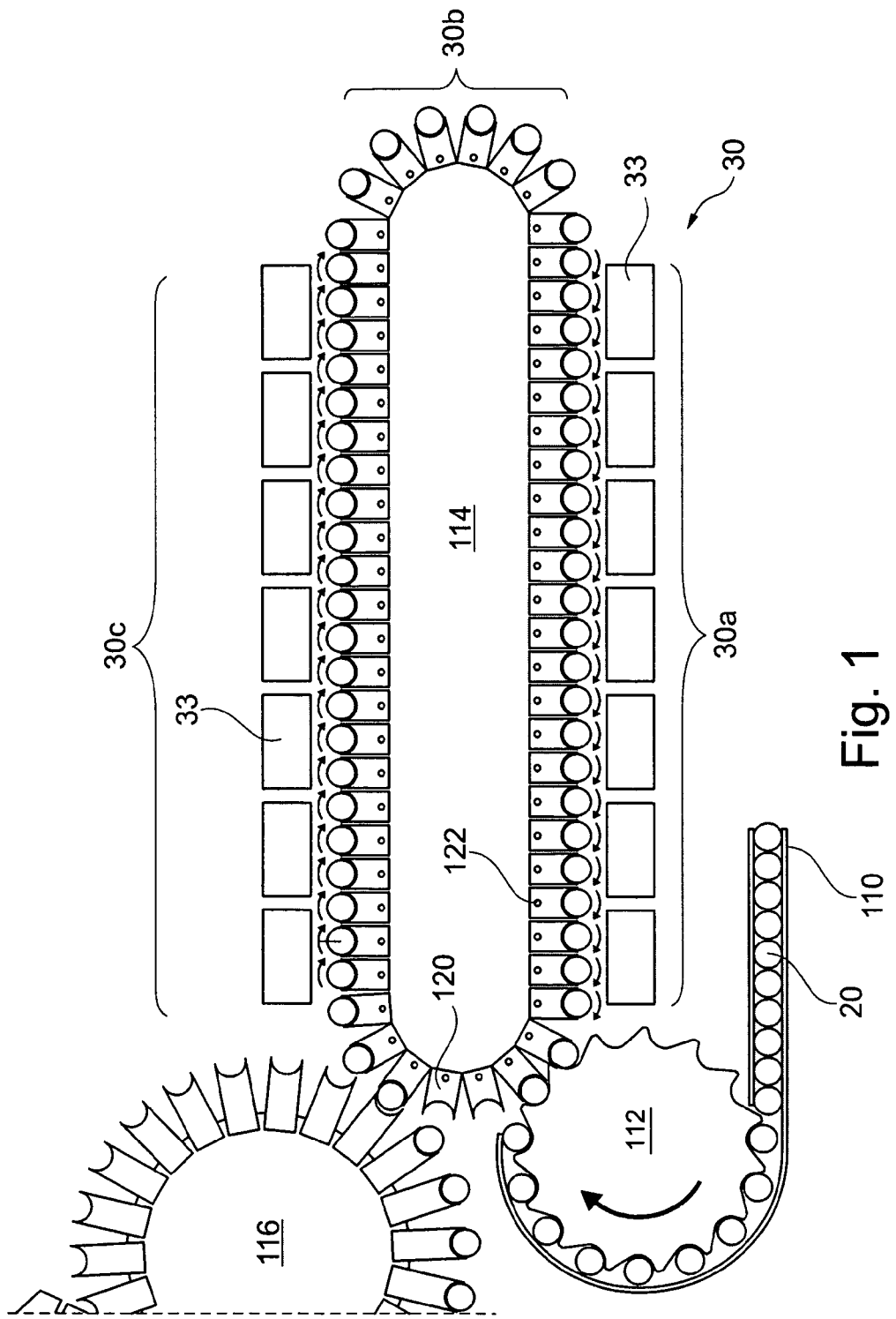
FIG. 1 shows a schematic representation of a heating device for the warming of preforms (according to the state of the art).

The same or equivalent elements of the invention are designated by identical reference characters. Furthermore and for the sake of clarity, only the reference characters relevant for describing the respective figure are provided. It should be understood that the embodiments described are only examples and they are not intended to limit the scope of the disclosure.

DETAILED DESCRIPTION

FIG. 1 shows a schematic representation of a heating device 30 for the warming of preforms 20 according to the prior art. The preforms 20 are delivered by transport means or transporter 110, the required distance is adjusted by a transport device, especially a saw tooth star 112 before the preforms 20 enter the oven or heating device 30.

Especially the preforms 20 are transported through the oven 30 by a continuous circumferential transport device 114. The preforms 20 are taken by a gripper or holder 120 arranged on a continuous endless transport chain 122. The preforms 20 are first transported through a linear heating line 30a, thereby passing through so called heating units 33 (see FIG. 2). IR emitters are distributed uniformly in these heating units 33 for throughoutly warming the preforms 20 around their whole mantle surface area. After a reversing part 30b at the end of the oven 30, the preforms 20 are transported back in a second straight heating line 30c where they are tempered to their final temperature. The heating units 33 furthermore contain reflectors to minimize the loss of radiation. The radiance emitted by the emitters that is not used for warming the preforms 20 is reflected by the reflectors and therefore not lost completely.

During the movement of the preforms 20 through the oven 30, the preforms 20 are preferably rotated around their longitudinal axis to achieve an equal uniform warming all around.

Afterwards the heated preforms 20 are transferred to a discharge device, preferably a discharge star 116 and moved on to a stretch blow molding device.

Figure 2:
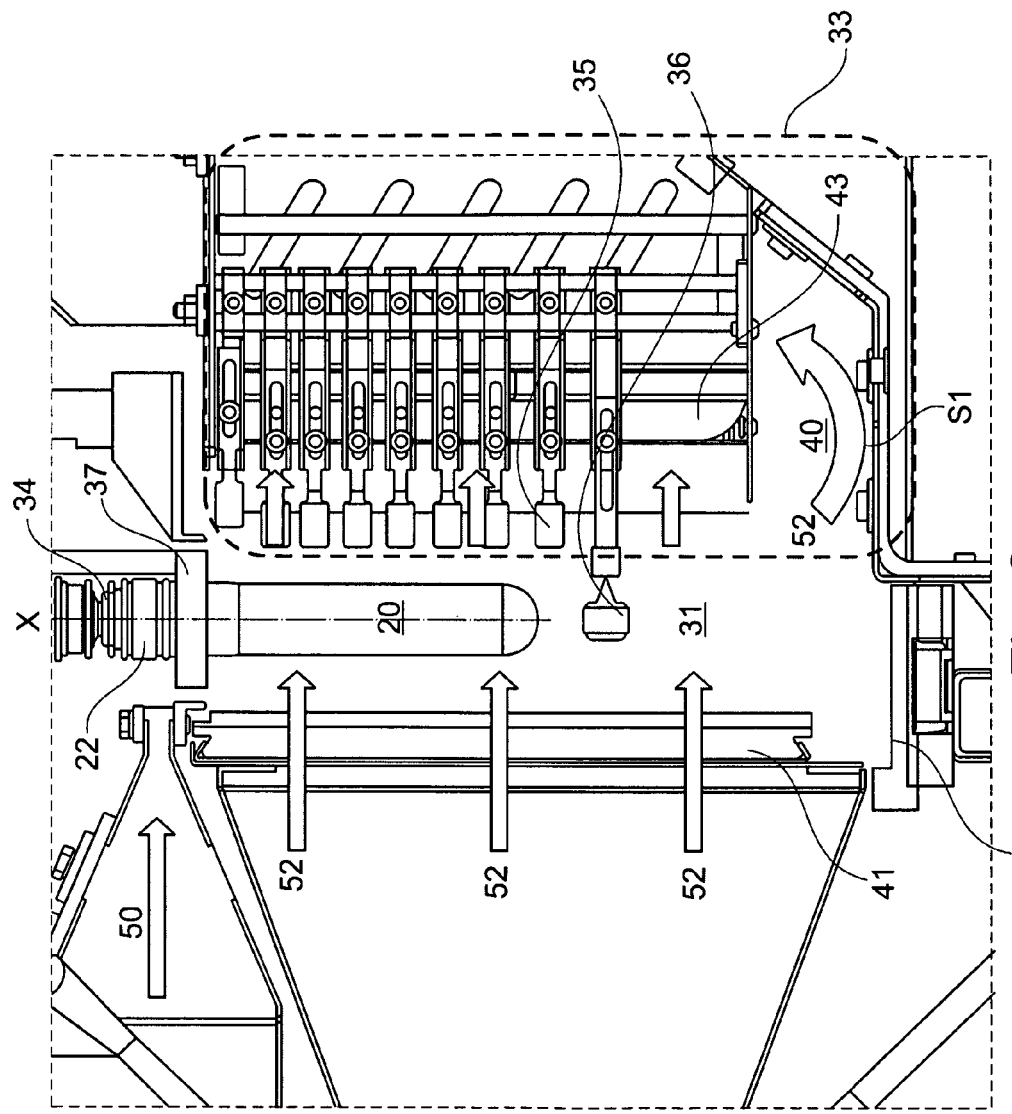
FIG. 2 shows a representation of the means for the cooling of emitters in a heating device (according to the state of the art).

FIG. 2 shows a representation of the means for the cooling of emitters in a heating device (according to the state of the art). The representation shows a heating lane 31 from a linear part 30a, 30c of a heating device 30 (see FIG. 1). The preform 20 held in a holding means or rotator 34 is preferably rotated when transported through the heating lane 31. To prevent excessive heating of the preform 20 that might even lead to melting or burning of the preform 20, cool air or another suitable coolant has to be fed into the heating lane 31. Especially the thread or mouth 22 of the preform 20 has to be shielded because it might be deformed otherwise. For this reason a so-called thread coolant flow 50 and at least one surface coolant flow 52 are required to cool the preforms 20. Additionally the thread or mouth region 22 is shielded from direct radiation by a shielding plate 37.

The IR emitters are arranged in a so-called heating unit 33. Especially the IR emitters are distributed in a way that the radiation heats the preforms 20 evenly along their whole length. Furthermore bottom emitters 36 are arranged in the lower part of the heating lane 31 so that the preforms 20 also get radiated/heated from below.

Reflectors are arranged in the heating lane 31 to optimally use the radiation of the emitters 35, 36. A counter reflector 41 is arranged behind the preform 20 opposite to the emitters 35, a bottom reflector 42 is arranged below the preform 20 and a back reflector 43 is arranged behind the emitters 35. The reflectors reflect the radiation that is not used when warming the preforms 20.

Because the IR emitters should not reach temperatures above 900° C. a sufficient cooling is required.

Usually a surface coolant flow 52 is used to cool the emitters also. The counter reflector 41 has slots through which a blower blows cool air 52 into the heating lane 31 towards the transported preforms 20. This cool air 52 cools down the surface mantle area of the preforms 20 to prevent burning. The air 52 passes through the preforms 20 towards the emitters 35, 36 thereby cooling them because the temperature of the emitters 35, 36 is considerably higher than the temperature of the air 52. The surface coolant flow 52 takes up the warm temperature of the emitters and gets quite warm before it encounters the back reflector 43. Part of this heated air 52 is drained through an opening 40 in the lower part of the heating unit 33 with the help of a natural suctional pull S1. But especially in the upper part of the heating lane 31 the naturally developing suctional pull S1 is not sufficient and the air 52 can not be optimally drained. This leads to an increased temperature of the upper emitters 35.

FIG. 3 shows a first embodiment of means for the cooling of emitters. Hereby especially and/or additionally the thread coolant flow 50 shall be used to cool the emitters 35. The thread coolant flow 50 is arranged above the surface coolant flow 52. The thread coolant flow 50 directly blows cold air onto the thread or mouth region 22 of the preforms 20. A part of the thread coolant flow 50 is branched off by a cooling plate 60 comprising at least one air conductor 62. The branched off air is used as an emitter coolant flow 51 and diverted downwards in a direction BR so that it passes behind the emitters 35. Thereby the emitters 35 are actively cooled. Furthermore the air behind the emitters 35 is transported optimally downwards. An air cushion of hot air is avoided which further optimizes the cooling of the emitters 35.

Figure 5:
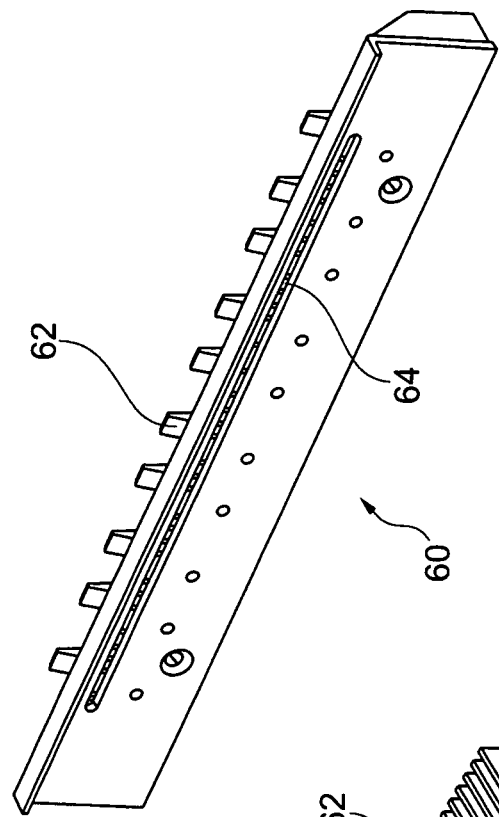
FIG. 5 shows another representation of a coolant plate with coolant conductors.
Figure 4:
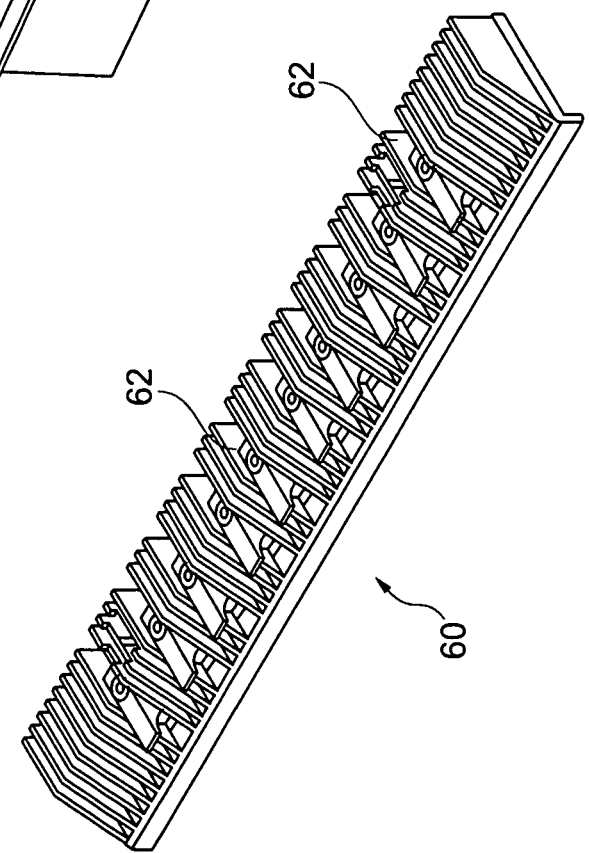
FIG. 4 shows a representation of a coolant plate with coolant conductors.
Figure 6:
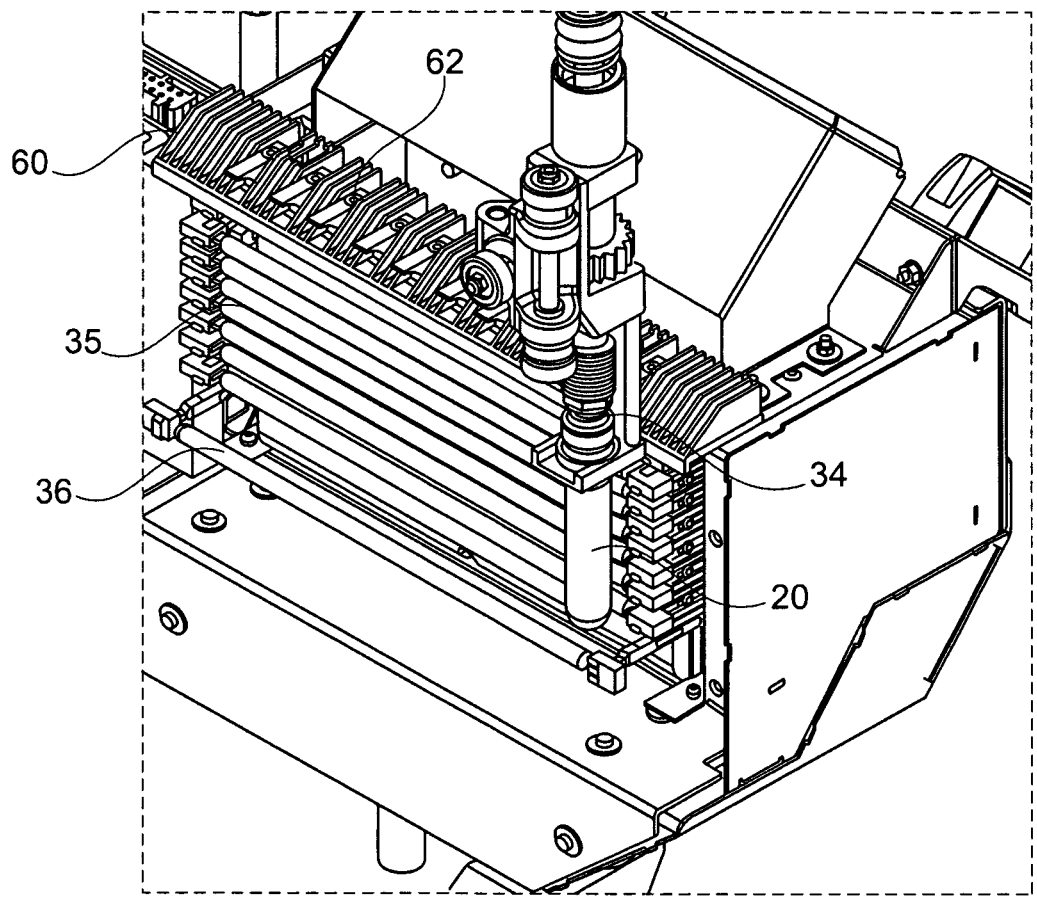
FIG. 6 shows a heating unit with a coolant plate.

FIG. 4 and FIG. 5 show different representations of a coolant plate 60 with a plurality of coolant conductors 62. The coolant plate 60 is used to branch off the second coolant flow 51 from the thread coolant flow 50. FIG. 6 shows a heating unit 33 with a coolant plate 60. The coolant conductors 62 branch off at least a part of the thread coolant flow 50 and divert it downwards through an opening slot 64. The branched off second coolant flow 51 is especially directed to pass behind the IR emitters 35, especially between the emitters 35 and the back reflector 43 (see FIG. 2).

The number of air conductors 62 determines and varies the amount of branched off air used for the emitter coolant flow 51. The air conductors 62 can be opened and/or closed by mechanic or electronic driven means. Preferably the movement of all air conductors 62 is controlled together. According to an alternative embodiment each air conductor 62 is individually controlled.

Figure 7:
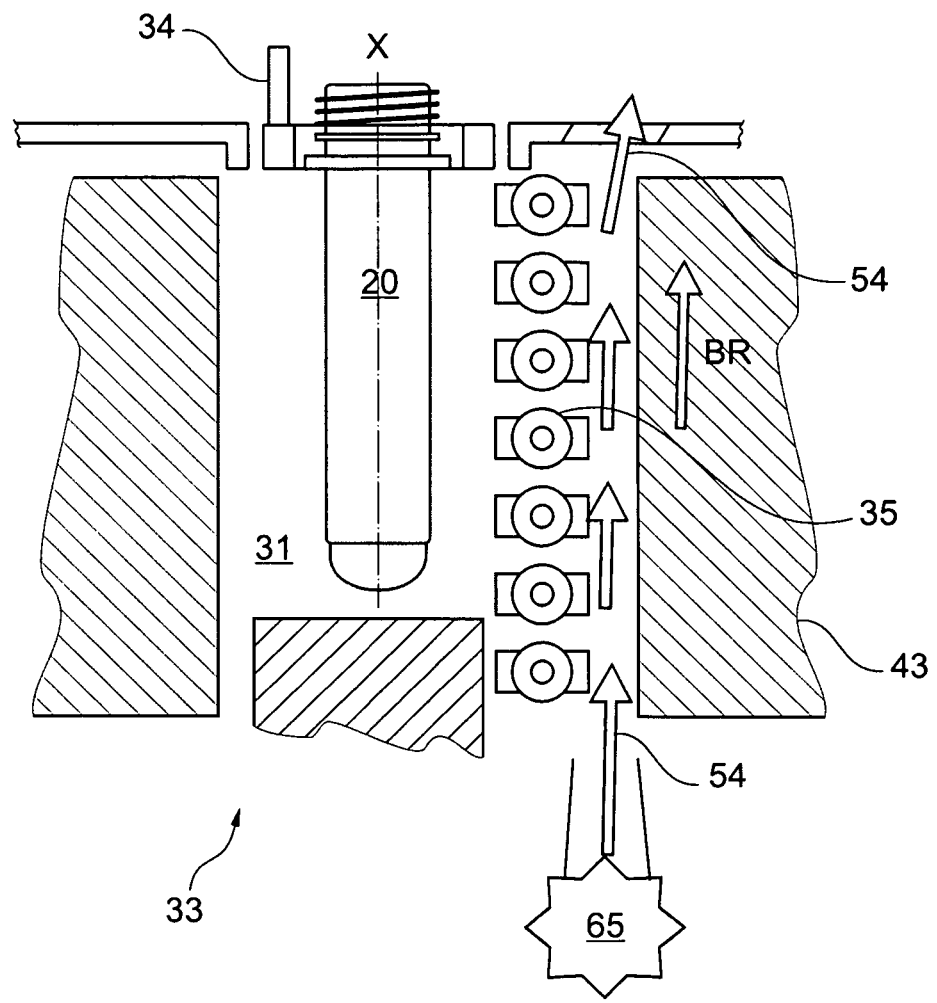
FIG. 7 shows a second embodiment of means for the cooling of emitters.

FIG. 7 shows a second embodiment of means for the cooling of emitters. In this embodiment an emitter coolant flow 54 is generated by a coolant producing device 65 and gets blown between the emitter bulbs 35 and the back reflector 43. This emitter coolant flow 54 cools the emitters 35 from behind.

The emitter coolant flow 54 can be generated in different ways. A fan, a blower, an air compressor, an air knife system or other suitable means can be used as coolant producing device 65.

Figure 8:
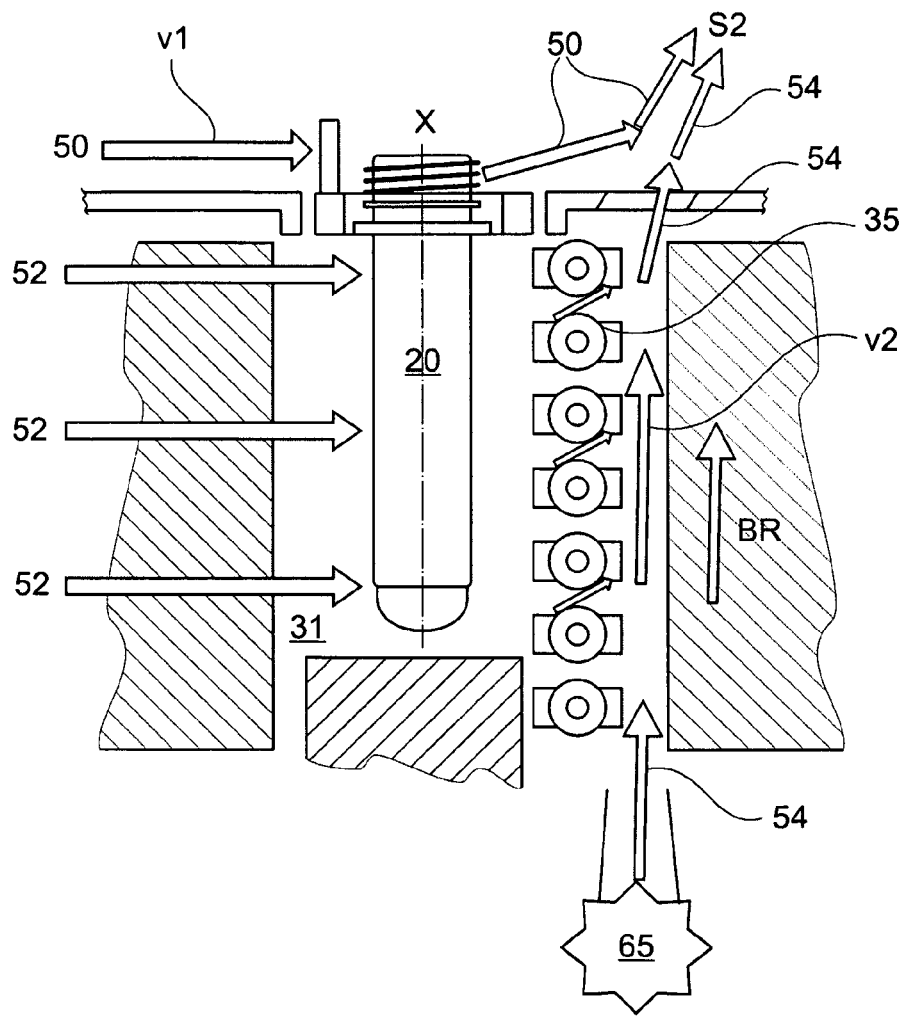
FIG. 8 shows the suction of the coolant flow in the second embodiment of means for the cooling of emitters.

FIG. 8 shows the suction of the coolant flow in the second embodiment of means for the cooling of emitters according to FIG. 7.

The emitter coolant flow 54 moves in direction BR parallel to the longitudinal axis of the preforms 20 between the emitters 35 and the back reflector 43 towards the mouth 22 of the preform 20. In the heating unit 33 the emitter coolant flow 54 moves upwards and is united with the thread coolant flow 50. Preferably the velocity v1 of the thread coolant flow 50 is higher than the velocity of the emitter coolant flow 54. The difference in velocities leads to a suctional pull S2 which is favorable for the whole air flow/air conveyance because the emitter coolant flow 54 is pulled out from behind the emitters 35.

In this way the preform surface coolant flow 52 can also be transported away from the heating lane 31.

The invention has been described with reference to preferred embodiments. To the expert it is also conceivable, however, to make changes and modifications without leaving the scope of protection of the appended claims.

List of Reference Numbers
20 preform
22 thread or mouth region
30 heating device/oven
30a first linear heating line
30b reversing part
30c second linear heating line
31 heating lane
33 heating unit
34 holding means
35 IR emitter
36 bottom emitter
37 shielding plate
40 opening
41 counter reflector
42 bottom reflector
43 back reflector
50 thread coolant flow/first coolant flow
51 branched off coolant flow
52 surface coolant flow
54 emitter coolant flow/second coolant flow
60 cooling plate
62 air conduct
64 opening slot
65 coolant producing device
110 transport means
112 saw tooth star
114 continuous transport means
116 discharge star
120 gripper/holder
122 transport chain
BR direction of movement
S1 suction
S2 suction
v1 velocity of the first coolant flow
v2 velocity of the second coolant flow
X longitudinal axis

What is claimed is:

1. A heating device for warming preforms before processing the preforms in a stretch blow or blow molding device, the performs including a mouth region and a longitudinal axis, the heating device comprising:

a heating alley with a conveyor for movement of the preforms along a transport route, IR emitters being arranged on at least one side of the transport route, at least one back reflector being arranged on a side of the IR emitters facing away from the preforms, and at least one cooler for the IR emitters, the cooler creating a substantially first coolant flow to cool the mouth region of the performs and a substantially vertical second coolant flow that passes substantially vertically between the IR emitters and the at least one back reflector, the second coolant flow being at least partially feedable by the first coolant flow and/or is unitable with the first coolant flow.

2. The heating device as recited in claim 1 wherein the cooler includes a coolant plate with at least one air or coolant conductor and at least one opening slot.

3. The heating device as recited in claim 2 wherein the coolant plate is arranged in such a way that a part of the first coolant flow is branched off and diverted so that it passes between the IR emitters and the at least one back reflector.

4. The heating device as recited in claim 1 wherein cooler includes a coolant producing device arranged in a way that the second coolant flow is produced by the coolant producing device and introduced behind the IR emitters and parallel to the longitudinal axis of the preforms towards the mouth region of the preform.

5. The heating device as recited in claim 4 wherein the coolant producing device is a fan, a blower or an air compressor.

6. A method for cooling IR emitters in the heating device for warming preforms as recited in claim 1, before processing the preforms in a stretch blow or blow molding device, where the IR emitters are arranged on at least one sidewall of the heating device parallel to a transport direction of the preforms, and at least one back reflector is arranged on the side of the IR emitters facing away from the preforms, the preforms to be warmed including a mouth region and a longitudinal axis, the method comprising:

cooling the mouth region with a first coolant flow, the first coolant flow being substantially horizontal; and passing a substantially vertical second coolant flow between the IR emitters and the at least one back reflector, the second coolant flow being at least partially fed by the first coolant flow and/or united with the first coolant flow.

7. The method as recited in claim 6 wherein the second coolant flow passes substantiallyparallel to the longitudinal axis of the preforms.

8. The method as recited in claim 6 wherein the second coolant flow is generated by a coolant producing device arranged in a way that the generated second coolant flow passes substantially parallel to the longitudinal axis of the preforms towards the mouth region of the preform.

9. The method as recited in claim 8 wherein the first and the second coolant flow are united above an arrangement of the IR emitters.

10. The method as recited in claim 8 wherein the first coolant flow has a higher velocity than the second coolant flow.

11. The method as recited in claim 10 wherein a suction pull is formed because of the different velocities of the first and second coolant flows.

12. The method as to claim 6 wherein the second coolant flow is generated by branching off and diverting at least part of the first coolant flow in such a way that the second coolant flow passes substantially antiparallel to the longitudinal axis of the preforms towards the mouth region of the preform.

13. The method as recited in claim 6 wherein ends and/or bulbs of the IR emitters are cooled.

\* \* \* \* \*